United States Patent Office 3,521,838
Patented July 28, 1970

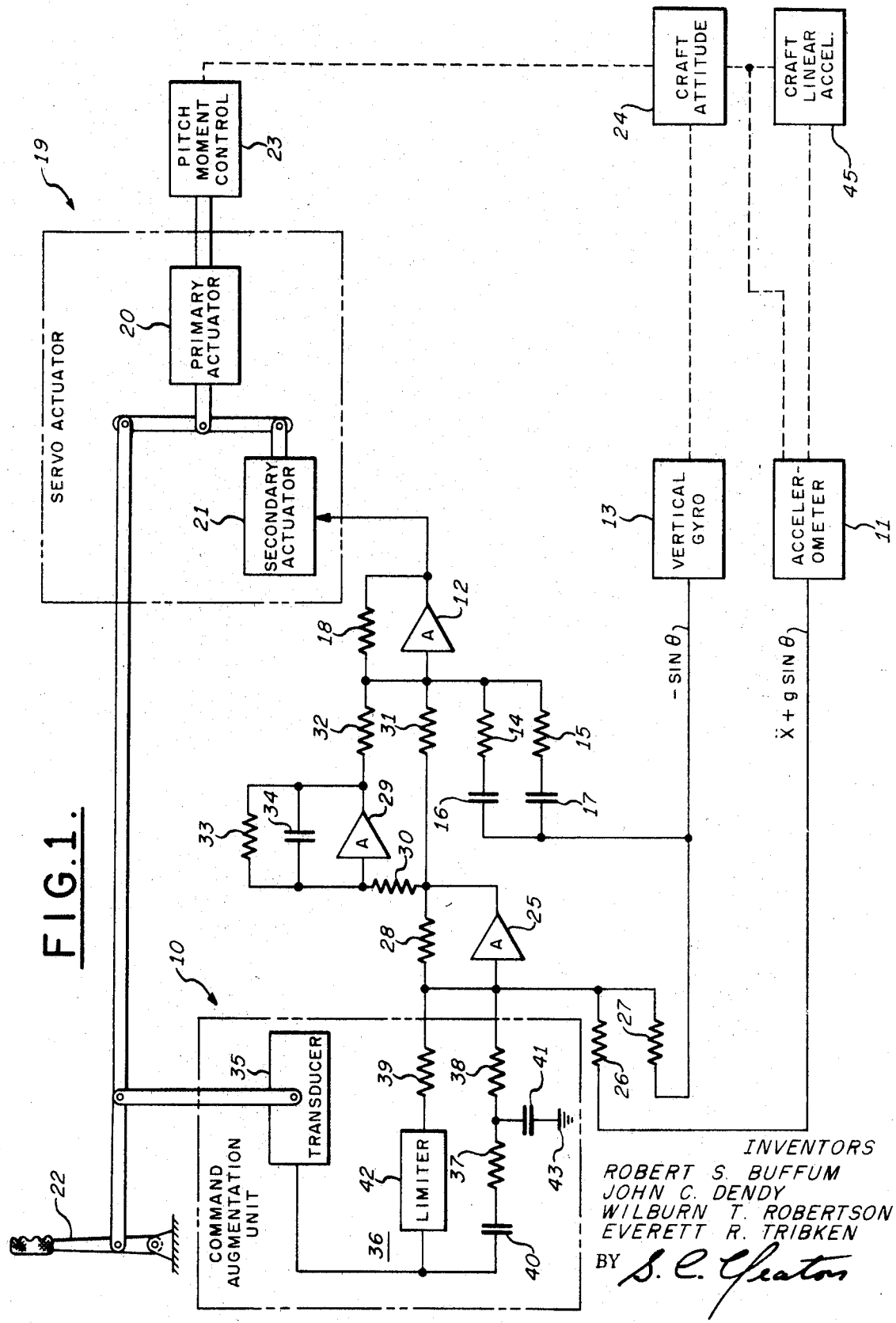

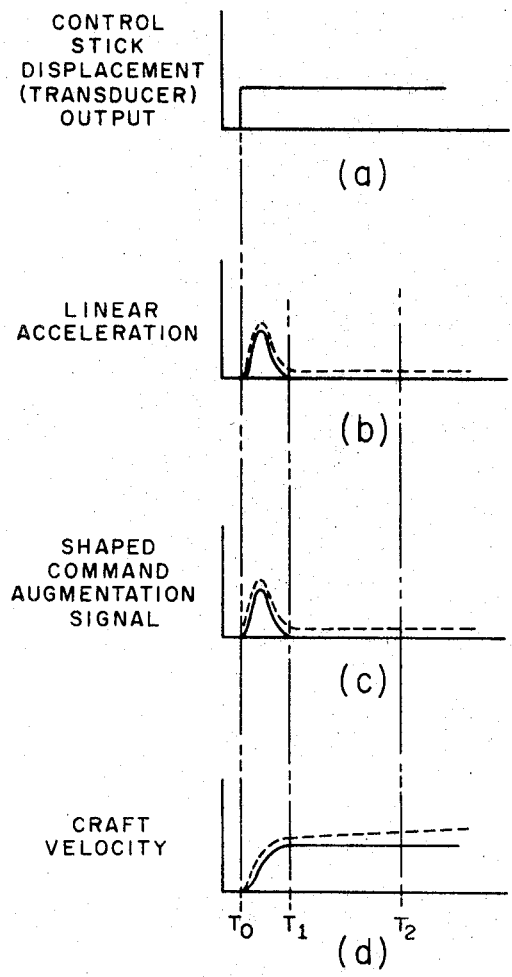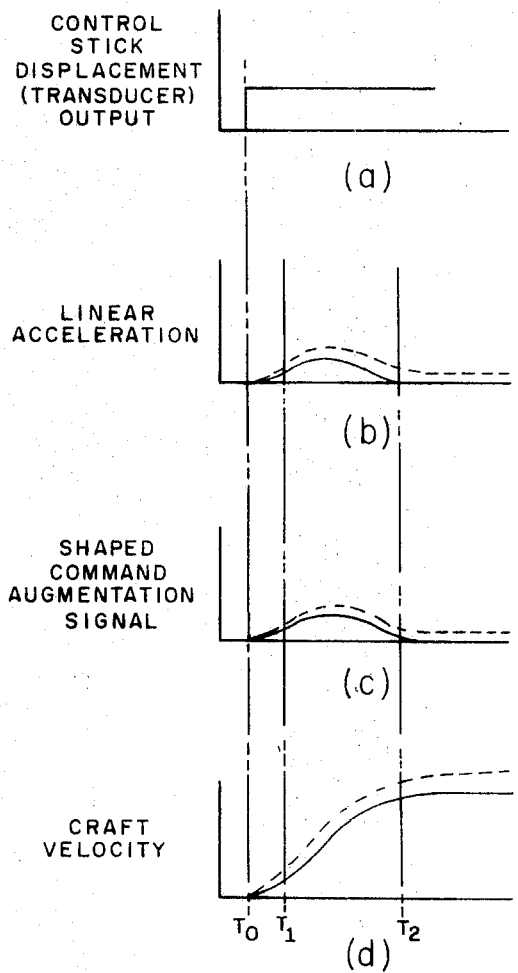

3,521,838
CONTROL APPARATUS FOR VTOL CRAFT
Robert S. Buffum and John C. Dendy, Phoenix, Ariz., Wilburn T. Robertson, Northridge, Calif., and Everett R. Tribken, Scottsdale, Ariz., assignors to Sperry Rand Corporation, a corporation of Delaware
Filed Aug. 9, 1967, Ser. No. 659,473
Int. Cl. B64c 13/22
U.S. Cl. 244—77     10 Claims

ABSTRACT OF THE DISCLOSURE

Flight control apparatus for aiding pilot handling and reducing the effect of external disturbances on VTOL aircraft in hover, transition and cruise flight. An orthogonal set of linear accelerometers function to attenuate externally induced translational motions of the craft and a vertical gyroscope stabilizes the craft attitude, the gyro also being operative to compensate for gravity components sensed by the accelerometers. Pilot handling is aided by a transducer providing a command signal proportional to motion of the control stick which is mechanically coupled to the flight control actuator mechanism. An electrical circuit shapes and mixes the command signal with the acceleration data thereby modifying it such that the craft responds to the control stick motion in a prescribed manner.

BACKGROUND OF THE INVENTION

This invention relates to flight control apparatus for VTOL craft and more particularly to relatively simple and inexpensive means for stabilizing the craft against external disturbances. The invention also relates to means for aiding a pilot in holding the craft above a fixed point or controlling its flight path relative to the earth.

A VTOL craft in hovering or transition flight is maintained above a fixed point on the ground or along a given flight path by controlling the magnitude and direction of a thrust force since aerodynamic lift forces utilized in cruise flight are small in the hover and transition modes. In a single rotor helicopter, for example, where the thrust force is directed normal to the rotor tip path plane, craft altitude is controlled by moving the collective pitch stick to adjust the pitch of the rotor blades. This varies the magnitude of the thrust force. Craft translational motion in the horizontal plane, on the other hand, is controlled by moving the cyclic stick to tilt the rotor. This produces a horizontal thrust component having a magnitude proportional to the tilt angle. To perform these control functions so that the craft is held over a reference point with a reasonable degree of accuracy requires considerable attention and effort even by an experienced pilot, especially when external disturbances are present. The rotor tilt associated with motion in the horizontal plane is of particular significance because this makes control in the lateral and longitudinal directions considerably more difficult than for the vertical direction. In the longitudinal control system, for example, motion of the cyclic pitch stick causes the craft to accelerate about its lateral axis. The relationship between control stick displacement (D) and pitch attitude acceleration may be expressed mathematically as $$D \approx K_1 \frac{d^2\theta}{dt^2} \quad (1)$$

where $K_1$ is a proportionality constant and $\theta$ represents craft pitch attitude. The resultant attitude displacement causes the craft to accelerate in the direction of its longitudinal axis. The relationship between craft attitude and longitudinal acceleration may be expressed mathematically as $$\theta = K_2 \frac{d^2 x}{dt^2} \quad (2)$$

where $K_2$ is a proportionality constant and $x$ represents craft displacement in the direction of the longitudinal axis. Combining Equation 1 and 2 yields $$D = K_1 K_2 \frac{d^4 x}{dt^4} \quad (3)$$

indicating that a pilot must provide a control signal which is the fourth derivative of the desired longitudinal displacement or, from another viewpoint, the longitudinal motion of a hovering craft is proportional to the fourth integral of the control stick motion.

The nature of this control problem and means for dealing with it are well known. The essential requirement is that the order of differential Equation 3 must be reduced to establish a more direct relationship between control stick motion and craft motion. This may be accomplished by feedback techniques wherein data input signals representative of various craft responses are applied to the flight control system together with pilot command signals. For instance, if a signal proportional to attitude rate is applied to the control system, the differential equation is reduced by one order of magnitude. If attitude displacement is also supplied as a data input, the system may be represented by a second order differential equation. Each data input represents a particular craft motion and operates to attenuate that motion. Utilization of various data inputs therefore eliminates the necessity for a pilot to anticipate the corresponding craft motion and thus simplifies the control task.

Attitude stabilization systems wherein craft attitude is compared with either an atttiude displacement command or an attitude rate command are commonly used to control both fixed wing and VTOL craft in cruise flight. These systems, however, are not ideal for hovering flight where the aerodynamic drag is small because a pilot command, which tilts the craft to a prescribed attitude, produces a predetermined horizontal thrust and concomitant linear acceleration thus causing the craft to move with linearly increasing velocity. In addition, attitude hold systems require almost constant attention to maintain a fixed craft position since external disturbances may cause the craft to move from a fixed point or prescribed flight path even though the attitude remains constant, in which case no data input will be provided to hold the craft stationary. The same conditions prevail in the transition mode where again the aerodynamic drag, although greater than for the hover mode, still is not sufficient to stabilize the velocity in a short period of time.

As a result of the aforementioned limitations of attitude stabilization systems in the hover and transition flight modes recent improvements in VTOL flight control systems have incorporated data inputs representative of craft translational motion in addition to the angular data inputs in order to ease the pilot's control task. In the case of a VTOL craft such as a helicopter the translational data inputs are also useful in the cruise mode. In the cruise mode attitude stabilization alone is sufficient to stabilize the craft rapidly at a constant velocity in response to a pilot command since the aerodynamic drag is appreciably higher than it is in the hover and transition modes. The velocity, however, will be constant with respect to the air mass rather than with the respect to the earth. This is so because a fixed rotor tilt produces a corresponding horizontal thrust which will be increased and decreased respectively by wind forces directed similarly and oppositely to the rotor thrust force, thereby causing the craft's velocity with respect to the earth to change. If a data input representative of the craft's earth referenced linear velocity is used in combination with the angular data input, the craft will move at the commanded velocity with respect to the earth because a wind gust which changes the craft velocity will produce an error signal causing the rotor tilt to adjust to a new angle so that constant earth referenced velocity is maintained.

From the foregoing remarks it should now be apparent that translational data feedback is required both to ease the pilot's control task and to correct for disturbances which do not affect craft attitude.

The length of time and the accuracy with which positional stability may be maintained against external disturbances is determined, however, by the nature of the translational data inputs. For instance, if linear acceleration, velocity and displacement are used the displacement error will approach but not reach zero while the velocity and acceleration errors reduce to zero. A system of this type will hereinafter be referred to as a position control system. To obtain zero displacement the integral of linear displacement would have to be provided as a data input along with the acceleration, velocity and displacement signals. On the other hand, if only linear acceleration and velocity are utilized as data inputs, the velocity error will approach but not equal zero. A system of this type will hereinafter be referred to as a velocity control system. In this case, if the velocity data is highly accurate, the velocity error will be small so that for a short time at least fairly good positional accuracy will be obtained. Over a longer period, however, even a small velocity error will permit a large position error to develop.

Position and velocity control systems are known in the prior art and as explained above these systems will provide good long and short term positional stability respectively with hands off control. The intrinsically high stabilization characteristics of these systems, however, causes them to react to commanded inputs and external disturbances in a similar manner with the result that pilot commands are impeded. Moreover, to obtain highly accurate positional stability, whether long term or short term, high quality, that is inertial quality, components must be used either to measure the acceleration, velocity and displacement directly or to derive one from the other by means of integrating and differentiating devices. In addition an inertial quality vertical reference must be employed to remove gravity components from the acceleration data in either an earth axis or aircraft body axis referenced system. It is therefore seen that prior art VTOL craft flight control systems incorporating both angular and translational data feedback are not only complicated and expensive but also not readily maneuverable by pilot inputs applied to the control stick which is mechanically or electrically coupled to the primary actuator mechanism.

SUMMARY OF THE INVENTION

In a preferred embodiment of the present invention a VTOL craft stabilization system is provided wherein translational data inputs representative of craft acceleration and a lagged replica thereof are used in conjunction with attitude rate and attitude displacement inputs. A system of this type will be referred to hereinafter as an acceleration control system. In this case the acceleration error approaches but does not reach zero so the velocity error increases continuously until it reaches a value where the aerodynamic drag is sufficient to stabilize the craft velocity. Consequently, accurate position with reference to a given ground point cannot be maintained for even a short period of time without the introduction of corrective pilot commands. Since the flight control system is pilot aided, however, components of automatic pilot quality may be used in place of the inertial quality components employed in prior art systems and still maintain facility of pilot handling. Moreover, because the equipment is less complicated, not only is reliability improved but also the size and cost of the system is substantially reduced.

Pilot aid is accomplished by coupling a transducer to the control stick to provide a signal representative of control stick motion. This signal is then shaped and mixed with the acceleration data input, the shaping being such that a prescribed transient acceleration of the craft occurs in response to the commanded input.

BRIEF DESCRIPTION OF THE DRAWINGS

FIG. 1 is a block diagram of a preferred embodiment of the invention;

FIGS. 2a to 2d depict craft responses to a commanded input and the associated electrical signals at various points in the control system of FIG. 1; and FIGS. 3a to 3d depict craft responses and the associated electrical signals which occur for an alternative form of the shaping network used in the control system of FIG. 1.

DESCRIPTION OF THE PREFERRED EMBODIMENT

Referring to FIG. 1, consider the operation of the longitudinal control system, disregarding for the moment the command augmentation unit 10 and strapped down accelerometer 11. Further, assume that the craft is operating in a heading hold mode, which may be accomplished preferably by an automatic mechanism such as a flux valve or magnetic compass, and at zero roll angle, it being understood that this assumption is made solely to facilitate the following discussion since it is not essential to the operation of the system. Under these circumstances the pitch attitude of the craft is stabilized by the pitch attitude displacement data input signal (sin $\theta$) fed to summing amplifier 12 from vertical gyro 13 through the network consisting of resistors 14 and 15 and capacitors 16 and 17. The sin $\theta$ signal, which is obtained from a synchro pickoff on the vertical gyro, has a polarity opposite to the gravity component sensed by accelerometer 11 in order to effect a cancellation thereof as will be explained subsequently. For small attitude angles where the sine of the angle is approximately equal to the angle in radians a linear pickoff on the gyro will provide the same result without any additional gravity compensation equipment. The transfer function established by the ratio of feedback resistor 18, connected across the input and output terminals of amplifier 12, to the impedance of the input network consisting of resistor 14 connected in series with capacitor 16 has a short time constant so that the pitch attitude data applied therethrough approximates attitude rate at the output of amplifier 12. Obviously, a rate gyro may be also used to obtain the attitude rate information. The transfer function produced by resistor 15 connected in series with capacitor 17 at the input to amplifier 12 has a substantially longer time constant than that provided by resistor 14 and capacitor 16 so that the attitude displacement signal (sin $\theta$) provides short-term attitude stabilization. If capacitor 17 was removed from the circuit the attitude signal would not reduce to zero in the steady state and as a consequence a command input would be impeded by the high gain generally associated with the attitude data input. If the attitude gain was low, however, it would not be necessary to shape the attitude signal since the craft would then operate in an attitude hold mode wherein the vertical gyro would simply provide a data input that matched the commanded input when the craft reached the desired attitude. The output of summing amplifier 12 connects to servo actuator 19 which comprises the conventional primary and secondary actuators 20 and 21 for summing the output signal from amplifier 12 with the command input from control stick 22 which is mechanically linked to the primary actuator. The output of servo actuator 19 connects to the pitch moment control 23 to regulate the craft attitude 24 which affects both the strapped down accelerometer 11 and craft linear acceleration 45 as well as the vertical gyro. Maneuvering is accomplished by moving control stick 22 to provide a command signal to pitch moment control 23 through servo actuator 19. As hereinbefore explained, however, attitude stabilization is not ideally suited to VTOL hover and transition mode operation. In the present invention, therefore, accelerometer 11 is used to sense craft linear acceleration 45 and provide translational data input. The longitudinal acceleration signal $$(\ddot{x} + g \sin \theta)$$

is summed with the attitude displacement signal (sin $\theta$) in amplifier 25 by being applied thereto through resistors 26 and 27, respectively, the ratio of these resistances being adjusted to cancel the gravity component sensed by accelerometer 11 and the ratio of resistor 26 being adjusted relative to resistor 28, connected across the input and output terminals of amplifier 25, to provide the desired gain for the acceleration data input $$(\ddot{x} + g \sin \theta)$$

Thus, the signal at the output of amplifier 25 will be zero for any attitude assumed by the craft during hover and transition flight when no external disturbances are present. The output of amplifier 25 connects to amplifier 29 through input resistor 30 and through input resistor 31 to amplifier 12 wherein it is summed with the signals from vertical gyro 13 and amplifier 29, the latter being applied through resistor 32. The combination of input resistor 30 and the parallel circuit consisting of resistor 33 and capacitor 34, connected across the input and output terminals of amplifier 29, forms a lag network which modifies the acceleration signal so as to produce at the output of amplifier 29 a signal which is a short-term approximate indication of craft linear velocity. The direct passage of the acceleration data from the accelerometer through amplifiers 25 and 12 to servo actuator 19 functions to attenuate high frequency external disturbances to which the craft is subjected while the parallel path through the lag network associated with amplifier 29 modifies the system response such that it functions as a velocity control in the range of pilot sensitivity. That is, the time constant of the lag network is adjusted so that in the range of aircraft motions having a frequency below that which the pilot can sense the craft has a constant gain as steady state is approached. In the aforementioned position and velocity control systems, on the other hand, the gain constantly increases as steady state is approached.

Now consider the operation of the flight control system. If a wind disturbance is directed against the nose of the craft tending to move it backward, the motion will be sensed by accelerometer 11 which applies a signal to the pitch moment control through summing amplifiers 25 and 12 and servo actuator 19 instructing the craft to nose-down so that a forward thrust component is produced to cancel the wind force and thus hold the craft stationary. In the case of a commanded disturbance calling for a nose-down attitude in order to move the craft forward, accelerometer 11 once again provides a data input through the summing amplifiers to the servo actuator instructing the craft to return toward zero attitude. Hence, the command is impeded as in the prior art position and velocity control systems except for the small craft tilt which occurs prior to response of the feedback control devices. As a result the craft continues to move with some low acceleration even after the system has responded to return the attitude and acceleration toward zero.

The command augmentation unit 10 overcomes the opposition to commanded inputs by providing a command augmentation signal which mixes with the acceleration data input in summing element 25 to modify the feedback so that the craft moves in response to the commanded input, the preferred maneuvering system being one in which the craft velocity is proportional to control stick displacement. The command augmentation signal could instead be applied to summing element 12 to modify the translational data feedback. Summing in amplifier 25 is preferred, however, to provide for operation of amplifier 29 in a low voltage linear range. The command augmentation signal is obtained from transducer 35 and transmitted through an input shaping network 36 to summing element 25. The shaping network characteristic is such that the command augmentation signal substantially diminishes the effect of the acceleration data input for a finite period until the craft attains a desired velocity. Thereafter, the output signal from the shaping network decreases to zero or some low value whereupon the acceleration feedback becomes effective in reducing the craft acceleration to zero. The foregoing remarks will be understood more fully by considering the following detailed description with reference to FIGS. 2a–2d and 3a–3d.

An abrupt displacement of the control stick by a given amount at time $T_0$ produces a step function electrical signal (FIG. 2a) at the output of transducer 35. It also produces, through the mechanical coupling to the primary actuator, a pitch attitude and linear acceleration of the craft which is represented by the electrical signal (FIG. 2b) at the output of the accelerometer. It should be understood that the illustrated pitch attitude and linear acceleration occur only when command augmentation is employed. In the absence of command augmentation the craft would assume a particular attitude which in the hover mode, for example, would cause the craft to move with linearly increasing velocity. Shaping network 36 transforms the step function electrical signal at the output of the transducer to the pulse form depicted in FIG. 2c, the pulse having approximately the same shape as the acceleration signal but lagging it by some small amount (not shown in the drawing). The shaping is such that the output of summing element 25 is held close to zero until the craft has accelerated enough to move at a prescribed velocity (FIG. 2d) corresponding to the displacement of the control strick. At that instant ($T_1$), the shaping network output signal (FIG. 2c) decreases to zero enabling the acceleration data input to reduce the craft acceleration to zero so that thereafter the craft moves at the commanded velocity.

The shaping network has a transfer function of the form $$\frac{K_s}{(\tau_1 s + 1)(\tau_2 s + 1)}$$

where K and $\tau_1$ and $\tau_2$ are the gain and time constants, respectively, and $s$ is the Laplace operator. This transfer function may be implemented by the electrical components comprising resistor 28, which forms the feedback network of amplifier 25, and resistors 37, 38 and 39, capacitors 40 and 41 and limiter 42 which form the input network of the summing amplifier, capacitor 40 being connected from the output of transducer 35 in series with resistors 37 and 38 which have capacitor 41 connected between their junction point and ground 43. Capacitor 40 connected in series between the transducer output and summing amplifier input reduces the static gain through this path to zero. Hence, the only steady state output is produced through the signal limited path of the shaping network consisting of resistor 39 and limiter 42 connected in series between transducer 35 and amplifier 25. The effect of this limited DC path is to insert a DC term upon which the signals and craft responses are superimposed as indicated by the dashed lines in FIGS. 2b, 2c and 2d. The reason for providing this path is to enable the pilot to balance out, by moving the control stick, the null offsets present in the inexpensive, autopilot quality components utilized in the invention. It is necessary, therefore, merely that the limiter have a threshold slightly greater than the range of null offsets. This may be provided, for example, by dividing the resistance of resistor 39 between two resistors and connecting a pair of parallel inverted diodes or series connected back-to-back Zener diodes to ground from the junction between the resistors. The diodes are connected in this manner in order to isolate the output terminals of the transducer and the input terminals of amplifier 25 from ground.

The velocity control conditions described above prevail when the time constant $\tau_1$ is relatively small such that the shaping network output signal quickly decreases to zero after initially responding to the step function input. If the time constant is made larger, the shaping network output (FIG. 3c) takes longer to diminish to zero, or the steady state value provided by the limiter path, in response to the step function command input (FIG. 3a). Consequently, the craft velocity (FIG. 3d) continues to increase beyond time $T_1$ to time $T_2$ so that it reaches a substantially larger value than for the velocity type command augmentation before the acceleration reduces to zero or the steady state value.

The foregoing description of the longitudinal control system is also applicable to the lateral control system since the dynamics of the two axes are similar except for the control moment produced by each inch of actuator displacement being different and as previously mentioned control in the vertical axis merely requires adjustment of the thrust magnitude. It should also be noted that the linear accelerometers may be strapped to the aircraft and used in conjunction with a vertical gyro and an axis conversion computer to provide gravity compensation and earth referenced acceleration data so that the craft position is stabilized with respect to earth rather than the air mass. Alternatively, the accelerometers may be mounted on a stable platform or vertical gyro to dispense with the axis conversion computer. Also, if craft attitude is held fairly level in hover operation, the strapped down configuration may be employed without axis conversion to provide a reasonably good approximation to an inertially referenced system.

While the invention has been described in its preferred embodiment, it is to be understood that the words which have been used are words of description rather than limitation.

What is claimed is:

1. A flight control system for VTOL craft having a servo actuator responsive to control inputs, said control system comprising
   means for stabilizing the craft attitude,
   means for stabilizing the translational motion of the craft relative to the ground, said translational motion stabilization means including
      means for sensing the translational motion of the craft and providing a signal representative thereof,
      means for nullifying the effect of gravity on the translational motion signal,
      a transducer coupled to a pilot control mechanism in the craft for providing a command signal proportional to the motion of the control mechanism, and
      means for shaping and summing the command signal with the translational motion signal, the shaping and summing means being operative to transform the command signal such that the stabilizing effect of the translational motion signal is temporarily diminished thereby enabling the craft to respond to the motion of the pilot control mechanism in a prescribed manner.

2. The apparatus of claim 1 wherein the translational motion stabilizing means further includes
   means for producing a lagged replica of the translational motion signal, and
   means for summing the lagged replica signal with the command and translational motion signals.

3. The apparatus of claim 1 wherein the translational motion signal represents linear acceleration of the craft.

4. The apparatus of claim 3 wherein the shaping and summing means has a transfer function of the form $$\frac{K_s}{(\tau_1 s+1)(\tau_2 s+1)}$$

thereby providing parallel AC and DC paths for the command signal, the DC path being operative to engage the pilot by motion of the control mechanism to cancel null offsets of the attitude and translational motion sensing means and respective summing means.

5. The apparatus of claim 4 wherein the time constant $\tau_1$ associated with the AC path has a value so that the translational velocity of the craft is proportional to the motion of the pilot control mechanism.

6. The apparatus of claim 4 wherein the time constant $\tau_1$ associated with the AC path has a value so that the translational acceleration of the craft is proportional to the motion of the pilot control mechanism.

7. The apparatus of claim 4 wherein the translational motion stabilizing means further includes
   means for producing a lagged replica of the acceleration signal, and
   means for summing the lagged replica signal with the command and acceleration signals.

8. The apparatus of claim 7 wherein the attitude stabilization means comprises a vertical gyro for providing a signal indicative of craft attitude and a gravity component in the acceleration signal is nullified by algebraically summing the attitude and acceleration signals.

9. The apparatus of claim 8 wherein the attitude stabilization means comprises attitude rate damping means provided by coupling the vertical gyro to a lead network.

10. The apparatus of claim 9 wherein the pilot control mechanism is mechanically coupled to the servo actuator mechanism.

References Cited

UNITED STATES PATENTS 3,132,828   5/1964   Edinger et al.

FERGUS S. MIDDLETON, Primary Examiner

U.S. Cl. X.R.

244—17.13; 318—489